The present invention relates to the sealing art and more particularly to an improved closure cap adapted to be applied to a container to form a hermetically sealed package.

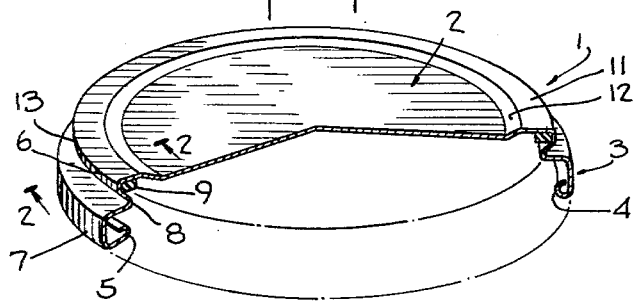
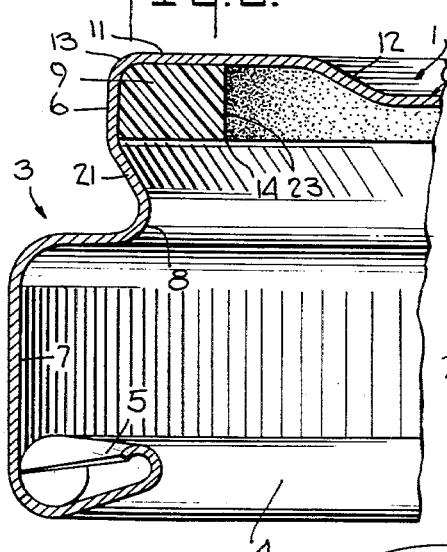
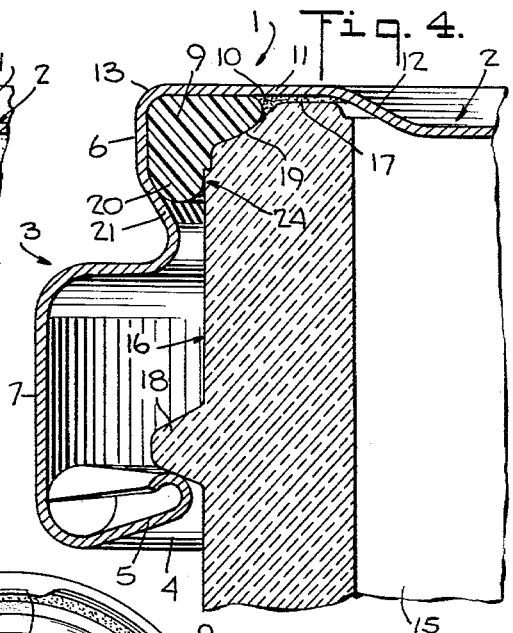
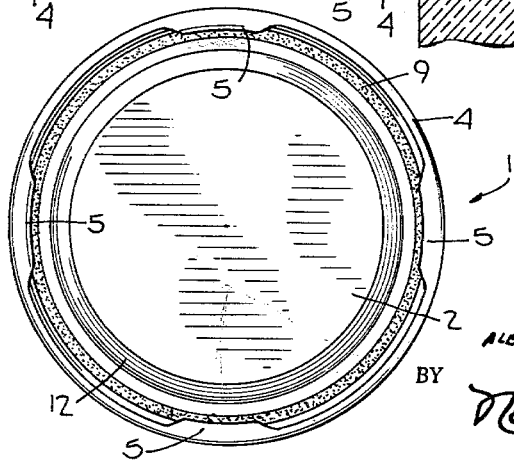
INVENTOR.
ALEXANDER W. HART 3,174,640
CLOSURE CAP AND SEALED PACKAGE
Alexander W. Hart, Lancaster, Ohio, assignor to Anchor Hocking Glass Corporation, Lancaster, Ohio, a corporation of Delaware
Filed Nov. 8, 1963, Ser. No. 322,393
4 Claims. (Cl. 215—40)

For many years heremetically sealed packages have utilized closure caps provided with sealing gaskets which cooperate with the container rim to form a tight seal therewith and hermetically seal the contents therein. Some sealing gaskets which are presently in use for such containers are the so-called "flowed-in" type gaskets which are formed by flowing a rubber-like gasket material, such as a plastisol, into the closure and curing the material in situ to harden it into a resilient gasket similar to a rubber gasket.

So-called "cut-ring" type gaskets are also in common use today. Such gaskets are made from a tube of vulcanized rubber, or other suitable material, from which the desired gaskets are cut. Such gaskets are then mounted in a closure cap and held in place by an adhesive or some other suitable means.

It has been found that closure caps in general use today have sealing gaskets which contact the container rim over a wide area. With such packages, not only is more gasket material necessary, which increases production costs, but also the increased contact area between the sealing gasket and the container rim increases the friction which must be overcome in cap removal so that it is difficult for such closure caps to be removed without the use of cap removers.

In order to overcome this, sealing gaskets of smaller size have been used. However, such small gaskets do not result in the tight seal required in hermetically sealed packages.

The present invention overcomes these defects and has for one of its objects the provision of an improved closure cap having a sealing means therein which will give a better seal.

Another object of the present invention is the provision of an improved closure cap which will permit a smaller sealing gasket to be used without impairing the desired tight seal.

Another object of the present invention is an improved sealed package in which the surface contact between the sealing gasket and the sealing surface of the container is small enough to permit the removal of the closure cap without the use of special tools and at the same time permit a smaller gasket to be used without adversely affecting the seal obtained.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective sectional view of a closure cap made in accordance with the present invention;

FIG. 2 is a sectional view taken along line 2—2 of FIG. 1 showing the position of the sealing gasket in said closure cap;

FIG. 3 is a bottom plan view of the closure cap shown in FIG. 1; and

FIG. 4 is a sectional view of a sealed package made in accordance with the present invention showing the position of the sealing gasket relative to the container when the closure cap is applied to a container.

Referring more particularly to FIGS. 1 to 3, the closure cap 1 of the present invention comprises a cover portion 2 and a skirt portion 3 depending therefrom. The lower edge of the skirt portion 3 is rolled inwardly to form a bead 4 and locking lugs 5 extend inwardly from the bead 4 at spaced intervals to permit the closure cap to be secured to a container 15 (FIG. 4).

The upper section 6 of the skirt 3 is set-in from the lower section 7 of the skirt 3. An annular inwardly directed tapered squeezing zone 8 is formed at the juncture between upper section 6 of the skirt 3 and the lower section 7 thereof to press the sealing gasket against the container. The squeezing zone 8 has an inclined upper wall 21 which facilitates insertion of a gasket 9 into the closure cap and also acts to squeeze the gasket 9 into sealing relationship with the container.

A gasket-receiving channel 10 is provided in the cover portion 2 to receive the sealing gasket 9 and is formed by the upper set-in section 6 of the skirt portion, an inclined shoulder 12 spaced inwardly from the upper section 6 of the skirt and a substantially flat top wall 11 connecting the shoulder 12 and the upper inset section 6.

The cut sealing gasket 9 which is adapted to be mounted in the closure cap comprises a thin ring of vulcanized rubber, or some other suitable material, which may be cut from a tube of rubber, or other suitable material.

The gasket 9 is mounted in the corner 13 of the gasket-receiving channel 10 formed by the upper inset section 6 and the top wall 11 on the gasket-receiving channel. The gasket 9 will rest on the squeezing zone 8 and is preferably adhered to the closure cap by a suitable adhesive. However, it will be understood that, if desired, the gasket need not be adhered to the closure, in which event the squeezing zone 8 will support the gasket 9. The squeezing zone 8 also helps to keep the gasket in place during handling of the closure cap.

In the drawings, the gasket 9 is shown as being rectangular with its corner 14 facing away from the corner 13. However, the present invention may also utilize a square gasket if desired. It will also be noted that the inner edge 23 of the sealing gasket 9 is spaced outwardly from the shoulder 12 of the gasket-receiving channel 10.

The container 15 on which the closure cap 1 is to be applied is shown in FIG. 4 and preferably comprises the usual glass finish 16 having an upper rim 17 and thread portions 18 adapted to cooperate with the locking lugs 5 on the closure cap when the cap is applied thereto to hold the closure cap on the container.

The container is provided with an outer inclined sealing surface 19 which extends downwardly and outwardly from rim 17. In the preferred embodiment shown in the drawings the inclined sealing surface 19 is shown as being slightly concave, however, the configuration of the inclined sealing surface 19 may be changed, if desired.

When the closure cap is applied to the container (FIG. 4) the corner 14 of the sealing gasket 9 will be pressed against the inclined sealing surface 19 of the container rim to form a tight seal therewith. Since the corner 14 of the sealing gasket 9 makes a generally point contact with the sealing surface 19, the area of surface contact between the two will be small. The small surface contact between gasket and sealing surface will tend to prevent the gasket from binding to the sealing surface.

In order to give a more secure seal the gasket 9 will be slightly squeezed as at 20, between the inclined wall 21 of squeezing zone 8 and the area 24 on the container finish below the sealing surface 19. Hence, although a smaller sealing gasket 9 is used the tight seal necessary for a commercial package is not sacrificed.

It will be seen from the above that the present invention provides an improved closure cap with improved sealing means therein which permit the use of a smaller gasket without sacrificing the sealing qualities of the gasket or the removability of the closure cap. The present invention also provides an improved sealed package which will permit easy removal of the closure cap.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A closure cap comprising a cover portion and a depending skirt portion, said skirt portion having an upper section and a lower section, said upper section being inset from said lower section, a shoulder in said cover portion, a gasket-receiving channel in the cover portion formed by said shoulder and said upper section, the top wall of the gasket-receiving channel being flat and substantially parallel to and above the cover portion of the closure cap, a sealing gasket in said gasket-receiving channel, the inner edge of said gasket being spaced from said shoulder, an inwardly directed zone at the juncture between said upper and lower sections of the skirt portion to squeeze the lower side of the gasket inwardly during sealing, and means on said closure cap for holding the closure cap on a container.

2. A closure cap comprising a cover portion and a depending skirt portion, an inwardly rolled bead at the lower edge of said skirt portion, locking lugs extending inwardly from said bead, said skirt portion having an upper section and a lower section, said upper section being inset from said lower section, a shoulder in said cover portion connected to said upper section of the skirt portion by a substantially flat top wall to form a gasket-receiving channel, the top wall of the gasket-receiving channel being substantially parallel to the cover portion, and a sealing gasket in said gasket-receiving channel and adhered to the corner formed by said upper section of the skirt and said flat top wall of the gasket-receiving channel, the inner edge of said gasket being spaced from the shoulder, an inwardly directed zone at the juncture between said upper and lower sections of the skirt portion to squeeze the lower side of the gasket inwardly during sealing.

3. A closure cap comprising a cover portion and a depending skirt portion, an inwardly rolled bead at the lower edge of said skirt portion, locking lugs extending inwardly from said bead, said skirt portion having an upper section and a lower section, said upper section being inset from said lower section, a shoulder in said cover portion connected to said upper section of the skirt portion by a substantially flat top wall to form a gasket-receiving channel, the top wall of the gasket-receiving channel being substantially parallel to the cover portion, a sealing gasket in said gasket-receiving channel adhered to the corner formed by said upper section of the skirt and said flat top wall of the gasket-receiving channel, the inner edge of said gasket being spaced from the shoulder, an inwardly directed zone at the juncture between said upper and lower sections of the skirt portion to squeeze the lower side of the gasket inwardly during sealing, said zone having an upper inwardly inclined wall.

4. A sealed package comprising a container having an upper rim and a concave inclined sealing surface extending outwardly from said rim, a closure cap comprising a cover portion and a depending skirt portion, an inwardly rolled bead at the lower end of skirt portion, locking lugs extending inwardly from said bead and adapted to cooperate with means on said container to hold the cap on the container, said skirt portion having an upper section and a lower section, said upper section being inset from said lower section, an inwardly directed zone at the juncture between said upper and lower sections of the skirt portion, said zone having an inwardly inclined upper wall, a shoulder in said cover portion connected to said upper section of the skirt by a substantially flat top wall to form a gasket-receiving channel, the flat wall of the channel being substantially parallel to the cover portion, a sealing gasket in said gasket-receiving channel adhered to the corner formed by said flat top wall and the upper section of the skirt, said gasket being spaced from said shoulder and having an exposed corner diametrically opposed to the corner of the closure which is adapted to cooperate with the inclined sealing surface of the container to form a seal therewith and the other portion of the gasket being pressed by the inclined wall of said zone against the side of said container below said sealing surface.

References Cited in the file of this patent
UNITED STATES PATENTS

| | | |
|---|---|---|
| 3,017,048 | Foye | Jan. 16, 1962 |
| 3,061,132 | Geddes | Oct. 30, 1962 |